US012469197B2

(12) United States Patent
Paczkowski et al.

(10) Patent No.: US 12,469,197 B2
(45) Date of Patent: Nov. 11, 2025

(54) METHODS AND SYSTEMS FOR PARTITIONING MEDIA CONTENT ACROSS DIFFERENT NETWORK SLICES IN A NETWORK

(71) Applicant: T-Mobile Innovations LLC, Overland Park, KS (US)

(72) Inventors: Lyle W. Paczkowski, Mission Hills, KS (US); George Jason Schnellbacher, Leawood, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 487 days.

(21) Appl. No.: 17/955,090

(22) Filed: Sep. 28, 2022

(65) Prior Publication Data

US 2024/0104817 A1    Mar. 28, 2024

(51) Int. Cl.
*G06T 13/40* (2011.01)
*G06T 19/00* (2011.01)
*H04W 24/10* (2009.01)
*H04W 48/18* (2009.01)

(52) U.S. Cl.
CPC ............ *G06T 13/40* (2013.01); *G06T 19/003* (2013.01); *H04W 24/10* (2013.01); *H04W 48/18* (2013.01)

(58) Field of Classification Search
CPC ....................................................... G06T 13/40
USPC .......................................................... 455/451
See application file for complete search history.

(56) References Cited

U.S. PATENT DOCUMENTS

| 5,555,244 | A  |   | 9/1996 | Gupta et al. |
| 6,172,990 | B1 |   | 1/2001 | Deb et al. |
| 6,512,773 | B1 |   | 1/2003 | Scott |
| 6,693,900 | B1 |   | 2/2004 | Kaaresoja et al. |
| 6,760,345 | B1 |   | 7/2004 | Rosengard |
| 7,581,094 | B1 |   | 8/2009 | Apostolopoulos et al. |
| 7,793,823 | B2 |   | 9/2010 | Klein, Jr. |
| 8,996,019 | B2 | * | 3/2015 | Eriksson ............... H04W 28/16 455/454 |
| 9,317,622 | B1 |   | 4/2016 | Zuromski et al. |
| 10,348,505 | B1 |   | 7/2019 | Crawforth et al. |
| 10,608,895 | B2 |   | 3/2020 | Shaw et al. |
| 11,100,197 | B1 |   | 8/2021 | Bernardi |
| 11,611,615 | B1 |   | 3/2023 | Long et al. |
| 11,792,259 | B1 |   | 10/2023 | Paczkowski et al. |
| 11,818,207 | B1 |   | 11/2023 | Paczkowski et al. |

(Continued)

OTHER PUBLICATIONS

Foreign Communication from a Related Counterpart Application, International Search Report and Written Opinion dated Oct. 23, 2023, International Application No. PCT/ US2023/071274.

(Continued)

*Primary Examiner* — Qutbuddin Ghulamali

(57) ABSTRACT

A method for partitioning media content across different network slices in a network is comprises receiving, by a device from a server via a first network slice, a first ledger and a first partition of objects. The first ledger comprises data describing the first partition of objects and parameters for rendering the first partition of objects, and the first network slice is a first logical portion of the network associated with network elements configured to forward traffic according to a first quality of service network performance criteria. The method further comprises rendering, by a rendering application of the device, the first partition of objects based on the first ledger.

20 Claims, 9 Drawing Sheets

(56) References Cited

U.S. PATENT DOCUMENTS

| | | |
|---|---|---|
| 12,003,660 B2 | 6/2024 | Bernardi |
| 12,132,782 B2 | 10/2024 | Paczkowski et al. |
| 12,278,860 B2 | 4/2025 | Paczkowski et al. |
| 2002/0003811 A1 | 1/2002 | Herrmann |
| 2002/0163911 A1 | 11/2002 | Wee et al. |
| 2004/0091114 A1 | 5/2004 | Carter et al. |
| 2007/0130359 A1 | 6/2007 | Amini et al. |
| 2009/0327244 A1 | 12/2009 | Rizal |
| 2011/0222683 A1 | 9/2011 | Struik |
| 2013/0046968 A1 | 2/2013 | Dinan |
| 2013/0275755 A1 | 10/2013 | Ignatchenko |
| 2015/0379276 A1 | 12/2015 | Glickman et al. |
| 2017/0163733 A1 | 6/2017 | Grefen et al. |
| 2017/0289316 A1 | 10/2017 | Solis |
| 2018/0103122 A1 | 4/2018 | Rothera et al. |
| 2018/0276600 A1 | 9/2018 | Fuller et al. |
| 2018/0323980 A1 | 11/2018 | Ahn et al. |
| 2019/0109713 A1 | 4/2019 | Clark et al. |
| 2019/0114182 A1 | 4/2019 | Chalakudi et al. |
| 2019/0121673 A1 | 4/2019 | Gold et al. |
| 2019/0158269 A1 | 5/2019 | Kesarwani et al. |
| 2019/0266132 A1 | 8/2019 | Rubenstein |
| 2019/0334985 A1 | 10/2019 | Bradley et al. |
| 2020/0014988 A1 | 1/2020 | Navali et al. |
| 2020/0159889 A1 | 5/2020 | Chui et al. |
| 2020/0159890 A1 | 5/2020 | Chui et al. |
| 2020/0169382 A1 | 5/2020 | Factor et al. |
| 2020/0302431 A1 | 9/2020 | Polehn et al. |
| 2021/0027265 A1 | 1/2021 | Hasek, IV |
| 2021/0029216 A1* | 1/2021 | Stockert .............. G06F 16/2365 |
| 2021/0117982 A1* | 4/2021 | Johnson .............. G06F 21/6245 |
| 2021/0274235 A1 | 9/2021 | Anderegg et al. |
| 2021/0329075 A1 | 10/2021 | Sardesai et al. |
| 2021/0360500 A1 | 11/2021 | Mehta et al. |
| 2021/0377041 A1 | 12/2021 | Covaci et al. |
| 2022/0038260 A1 | 2/2022 | Chakra et al. |
| 2022/0038288 A1 | 2/2022 | Chakra et al. |
| 2022/0159096 A1 | 5/2022 | Mantri et al. |
| 2022/0182217 A1 | 6/2022 | Jaquette et al. |
| 2022/0182219 A1 | 6/2022 | Jaquette et al. |
| 2022/0217317 A1 | 7/2022 | Xu et al. |
| 2022/0263786 A1 | 8/2022 | Brown et al. |
| 2022/0351468 A1 | 11/2022 | Rahman et al. |
| 2022/0407707 A1 | 12/2022 | Gaur et al. |
| 2022/0414664 A1 | 12/2022 | Liu et al. |
| 2023/0032836 A1 | 2/2023 | Pabón et al. |
| 2023/0111001 A1 | 4/2023 | Jaquette et al. |
| 2023/0185996 A1 | 6/2023 | Jenrola |
| 2024/0015212 A1 | 1/2024 | Paczkowski et al. |
| 2024/0106884 A1 | 3/2024 | Paczkowski et al. |

OTHER PUBLICATIONS

"Paczkowski, Lyle W., et al., ""Methods and Systems for Distributing Rendering Across Devices in a Customer Premise,"" filed Jul. 28, 2023, International Application No. PCT/US23/71274."

Paczkowski, Lyle W., et al., "Methods and Systems for Distributing Rendering Across Devices in a Customer Premise," filed Sep. 1, 2023, U.S. Appl. No. 18/460,363.

Paczkowski, Lyle W., et al., "Methods and Systems for Ledger Based Content Delivery Using a Mobile Edge Computing (MEC) Server," filed Sep. 25, 2023, U.S. Appl. No. 18/474,018.

Office Action dated Sep. 10, 2024, U.S. Appl. No. 18/460,363, filed Sep. 1, 2023.

Notice of Allowance dated Jun. 2, 2023, U.S. Appl. No. 17/955,096, filed Sep. 28, 2022.

Notice of Allowance dated Jul. 3, 2023, U.S. Appl. No. 17/860,937, filed Jul. 8, 2022.

Notice of Allowance dated Jan. 2, 2025 U.S. Appl. No. 18/460,363, filed Sep. 1, 2023.

Paczkowski, Lyle W., et al., "Methods and Systems for Ledger Based Content Delivery Using a Mobile Edge Computing (MEC) Server," filed Jul. 8, 2022, U.S. Appl. No. 17/860,937.

Paczkowski, Lyle W., et al., "Methods and Systems for Distributing Rendering Across Devices in a Customer Premise," filed Sep. 28, 2022, U.S. Appl. No. 17/955,096.

Office Action dated Mar. 26, 2024, U.S. Appl. No. 18/474,018, filed Sep. 25, 2023.

Notice of Allowance dated Jul. 11, 2024, U.S. Appl. No. 18/474,018, filed Sep. 25, 2023.

* cited by examiner

METHODS AND SYSTEMS FOR PARTITIONING MEDIA CONTENT ACROSS DIFFERENT NETWORK SLICES IN A NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Currently, streaming media transmission through the network accounts for about 82 percent (%) of total Internet traffic, with the amount of bandwidth occupied by streaming media transmissions exponentially increasing each year. Media content is conventionally sent from content servers directly to end user devices, such that the end user device is responsible for streaming and rendering the media content. However, increasing numbers of end user devices, such as wearable devices and Internet of Things (IoT) devices, do not include the processing, rendering, and power capabilities of standard laptops and handheld devices. For example, end user devices do not include the power capacity to continuously stream and render media content, particularly interactive gaming content. Therefore, there is a need to provide a more efficient mechanism by which to provide streaming media content from the content servers to end user devices.

SUMMARY

In an embodiment, a method for partitioning media content across different network slices in a network, implemented by a server and one or more devices is disclosed. The method comprises partitioning, by a partitioning application of a server in the network, different types of media content objects in one or more media packages into a plurality of partitions of objects based on one or more attributes of the media content objects, in which each partition comprises media content objects having common attributes. The method further comprises determining, by the partitioning application, a network slice in the network by which to transmit a partition of objects. The network slice is a logical portion of the network associated with network elements configured to forward traffic according to a distinctive quality of service network performance criteria. The method further comprises transmitting, by the server via the network slice, a package comprising a ledger and the partition of objects to one or more devices for processing and rendering at the one or more devices. The ledger comprises data describing the partition of objects and parameters for rendering the partition of objects across the one or more devices. The method further comprises rendering, by a rendering application of the one or more devices, the partition of objects according to the ledger, generating, by the rendering application of the one or more devices, an update message indicating an update to a first object in the partition of objects, in which the update to the first object is based on a user interaction with the first object in rendered form at the one or more devices, and wherein the media content is a video game, and transmitting, by the one or more devices, the update message to the server via the network slice, in which the server forwards the update message to another device rendering the first object.

In another embodiment, a method for partitioning media content across different network slices in a network is disclosed. The method comprises packaging, by a packaging application of a server in the network, media content into a plurality of media packages, in which each of the media packages comprises a plurality of different types of media content objects, and partitioning, by a partitioning application of the server, the different types of media content objects in one or more of the media packages into a plurality of partitions of objects based on one or more attributes of the media content objects, in which each partition comprises media content objects having common attributes. The method further comprises determining, by the partitioning application, a network slice in the network by which to transmit a partition of objects based on at least one of preset partition-to-slice mappings, network conditions, or the common attributes of the media content objects included in the partition of objects. The network slice is a logical portion of the network associated with network elements configured to forward traffic according to a distinctive quality of service network performance criteria. The method further comprises indicating, by a ledger application of the server, the network slice in a ledger corresponding to the partition of objects, in which the ledger comprises data describing the partition of objects and parameters for rendering the partition of objects across one or more devices, and transmitting, by the server via the network slice, a package comprising the ledger and the partition of objects to the one or more devices for processing and rendering at the one or more devices.

In yet another embodiment, a method for partitioning media content across different network slices in a network is disclosed. The method comprises receiving, by a device from a server via a first network slice, a first ledger and a first partition of objects. The first ledger comprises data describing the first partition of objects and parameters for rendering the first partition of objects, and the first network slice is a first logical portion of the network associated with network elements configured to forward traffic according to a first quality of service network performance criteria. The method further comprises receiving, by the device from the server via a second network slice, a second ledger and a second partition of objects. The second ledger comprises data describing the second partition of objects and parameters for rendering the second partition of objects, and the second network slice is a second logical portion of the network associated with network elements configured to forward traffic according to a second quality of service network performance criteria. The method further comprises rendering, by a rendering application of the device, the first partition of objects based on the first ledger and the second partition of objects based on the second ledger, transmitting, by the device to the server via the first network slice, a first update message indicating a first update to a first object in the first partition of objects, receiving, by the device from the server via the second network slice, a second update message indicating a second update to a second object in the second partition of objects, and rendering, by the rendering application, the second update to the second object based on the update message.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
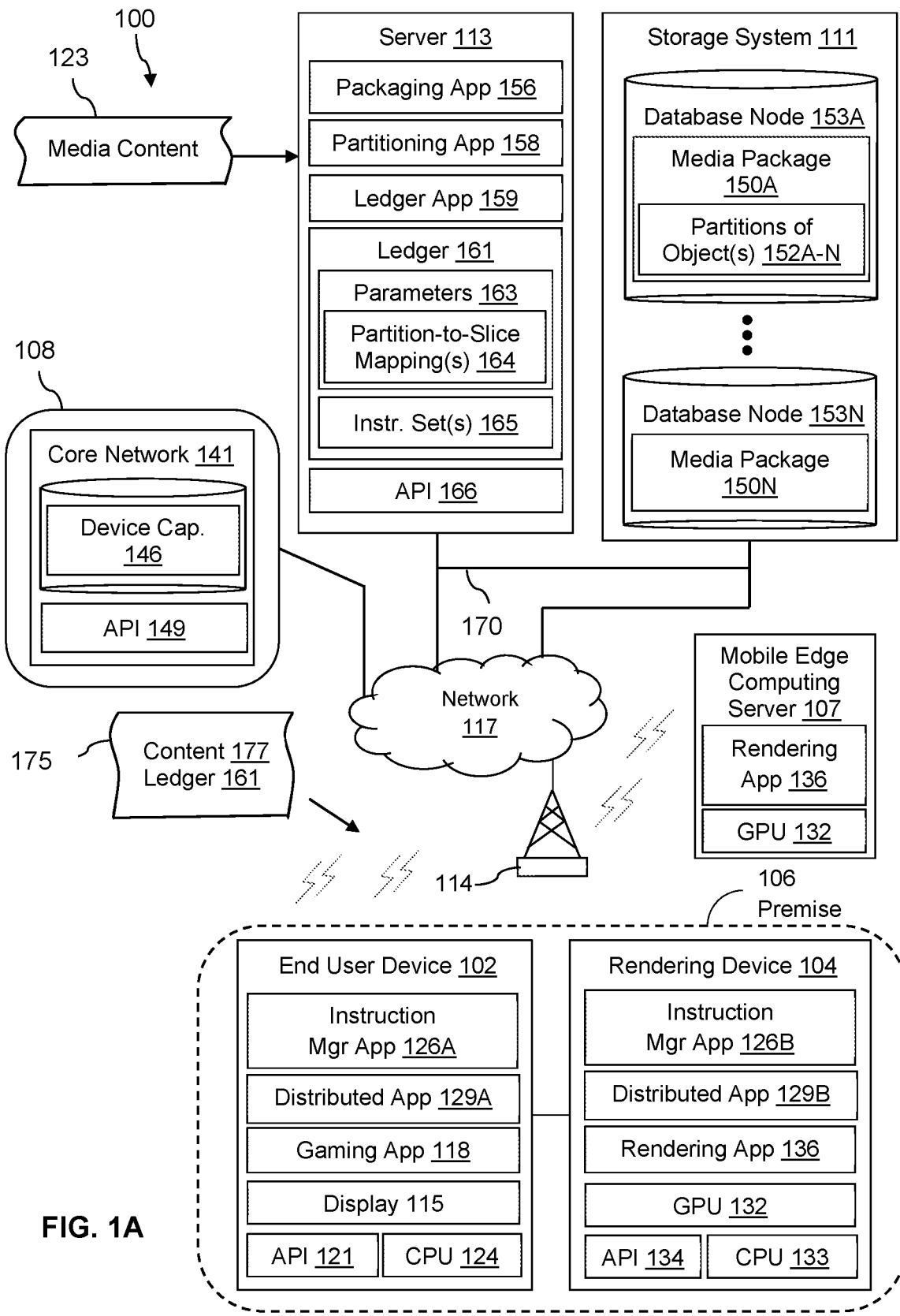
FIGS. 1A-B are block diagrams of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, streaming media and interactive media, such as gaming, consume the vast majority of home broadband Internet usage. The consumption patterns for streaming media and augmented reality/gaming devices may soon provide significant stresses to the network load and capacity. Moreover, an increasing number of end user devices are becoming smaller in size to satisfy the consumer need for more convenient and compact devices. As these devices get smaller, the devices may lack the requisite hardware to process and render complex media files. These devices may also lack the power supply to process and render such media files for longer periods of time. Therefore, the method of simply transmitting the requested media files to the end user device may soon be outdated since these devices may not be capable of rendering the media.

Cloud rendering has been introduced as a method of resolving the foregoing problems such that the lightweight devices may not be required to perform all of the complex streaming and rendering operations. Instead, a cloud system streams the media content (e.g., executes, renders, and encodes the media content) and then sends the rendered media content to the end user devices. Cloud rendering has become increasingly popular in the field of interactive gaming, thereby enabling video games to be accessible on demand without the need to download and install the game locally. Cloud rendering also enables video games to be accessible on a wider range of devices with lower power capacity and hardware requirements. However, transmitting rendered media content across the network consumes an excessive amount of network resources due to the size of the rendered media content being transmitted through the network.

One option to resolve the foregoing technical problems in the technical field of media file transmissions may be to use a mobile edge computing (or a multi-access edge computing) (MEC) server positioned at an edge of the network between the end user device and the cloud system. The MEC server, instead of the cloud system, may perform the complex rendering of media content (i.e., streaming video, audio, interactive game, metaverse, etc.) on behalf of the end user device. Details regarding the use of the MEC server to render media content and forward the rendered media content to the end user device is further described in U.S. patent application Ser. No. 17/860,937, entitled "Methods and Systems for Ledger Based Content Delivery Using a Mobile Edge Computing (MEC) Server," by Lyle W. Paczkowski and George Jason Schnellbacher, filed on Jul. 8, 2022 ("'937 patent application"), hereby incorporated by reference in its entirety.

Another option to resolve the foregoing technical problems is to designate a separate rendering device at the same customer premise as the end user device, such that the complex rendering operations are performed at the rendering device instead of the end user device. Details regarding the distribution of rendering between multiple devices at a customer premise is further described in U.S. patent application Ser. No. 17/955,096, entitled "Methods and Systems for Distributing Rendering Across Devices in a Customer Premise," by Lyle W. Paczkowski and George Jason Schnellbacher, filed on Sep. 28, 2022 ("'096 Patent Application"), hereby incorporated by reference in its entirety.

Regardless of where content is rendered in the network and how the content is rendered through the network, particular types of media content, particularly interactive gaming media content, is still extremely rendering and processing intensive. In addition, the transmission of gaming media content is largely inefficient due to the size of the media files needing to be transmitted for the gaming media content, regardless of whether the gaming media content has been rendered or not. Lastly, cloud based gaming media generally requires low latency and low jitter for at least certain frames or rendered objects of the gaming media. However, the massive file sizes required for cloud based gaming media and the complex rendering computations utilized for such gaming media hinders the ability of gaming media providers to meet these low latency and low jitter requirement.

The present disclosure addresses the foregoing technical problems by providing a technical solution in the technical field of media file transmissions across a network. In general, the present disclosure relates to a system for categorizing media content objects into different partitions of objects, and transmitting the different partitions of objects to the end user device across dedicated network slices according to distinctive quality of service (QoS) network performance criterion for different partitions of objects. The content being transmitted may already be rendered or may not yet be rendered, such that the rendering may be performed by the cloud system, MEC server, and/or distributed across multiple devices in a customer premise, as further described herein. In an embodiment, the system may include a cloud storage system, a server communicating with the cloud storage system, a core network, an MEC server, and one or more devices at a customer premise.

The system components may communicate with one another to categorize to-be rendered media objects according to attributes of the media objects and then delivering the media objects, in rendered or to-be rendered form, over a designated network slice to a device. The designated network slice may be based on current network conditions and/or the attributes of the media objects. The receiving device may be an end user device, a rendering device, or an MEC server according to various embodiments. By transmitting certain types of media content objects over designated network slices, media content objects that may be more significant or are updated/interacted with more regularly can be delivered to end user devices and rendered in a prioritized manner.

The cloud storage system may be a decentralized file system, such as, for example, an interplanetary file system (IPFS), storing media content in a distributed manner. Media content may be published to the storage system. A packaging application at a server coupled to the storage system may segment the content into multiple media packages, each including raw data and files related to a segment of the media content. The storage system may store the different media packages across different database nodes (e.g., IPFS clusters) in the storage system.

In an embodiment, a partitioning application may partition (e.g., categorize, separate, or divide) media content objects in each of the media packages into different partitions of objects based on attributes of the media content objects. For example, a media package of a gaming media may include stationary media content objects (e.g., background, trees, buildings, etc.), current player media content objects (e.g., current player avatar, vehicles, tools, actions performed by the current player on other media content objects, etc.), and opposing player media content objects (e.g., opposing player avatars, other characters, opposing player vehicles, actions performed by the opposing player on other media content objects, etc.). In this way, the partitioning application may first categorize the media content objects into one of three different partitions of objects (e.g., current player media content objects, opposing player media content objects, and stationary or low motion objects). The term "partition of objects" as used herein may refer to a categorization of one or more media content objects in one or more media packages that have the same or similar attributes.

After partitioning the media content objects, in an embodiment, the partitioning application may further sub-partition (e.g., further categorize, separate, or divide) each of the media content objects in the different partitions of objects based on various rendering properties of the media content objects. For example, the rendering properties may include a position of the media content object, an artificial intelligence boolean of the media content object, a sprite of the media content object, an axis aligned bounding box (AABB) of the media content object, a velocity of the media content object, an input boolean of the media content object, and/or other properties used to perform the rendering of the media content object. The rendering properties may also include certain rendering effects that are to-be performed on the media content object. For example, the rendering effects may include a shading, texture mapping, bump mapping, fogging, shadow, soft shadow, reflection, transparency, translucency, refraction, diffraction, indirect illumination, caustic, depth of field, motion blur, non-photorealistic rendering of the media content object, and/or any other type of rendering effect that may be performed on a media content object.

As an example, the partitioning application may first partition each of the media contents into different partitions of objects, which may include media content objects categorized as either current player media content objects, opposing player media content objects, or stationary or low motion objects. Subsequently, the partitioning application may sub-partition each of the media content objects within the different partitions of objects based on a rendering property of the media content objects or a rendering effect to be performed on the media content objects. In this way, the partitioning application partitions or categorizes different media content objects in each of the media packages into different partitions of objects based on attributes of the media content objects. As mentioned above, the attributes of the media content objects describe whether the media content object is related to a stationary object, a current player action, an opposing player action, a rendering property, a rendering effect, or any other characteristic of the media content object.

In an embodiment, the network may be a $5^{th}$ generation network implementing network slicing, such that multiple network slices are provisioned in the network. Suppose that certain media content objects may need to be rendered faster than other media content objects. In this case, the use of network slices in transmitting media content objects, whether already rendered or not, enables certain partitions of objects having a higher priority to be transmitted across a network slice with a higher QoS network performance characteristics, while enabling other partitions of objects having a lower priority to be transmitted across a network slice with a less strict QoS network performance characteristics. The QoS network performance characteristic may be based on various network performance criterion, such as, for example, data throughput rate, jitter value, latency value, etc. For example, media content objects related to objects in motion (which may be categorized as a certain partition of objects) may be updated more frequently than stationary objects, and thus be assigned a higher priority than stationary objects.

In this case, the partitioning application may determine a network slice by which to transmit the partition of objects in motion to one or more devices based on the QoS network performance characteristics of the network slices and/or attributes of media content objects in the partition. In one embodiment, the server may maintain mappings between partition types and corresponding network slices, such that the partitioning application may perform a look-up in the mappings to determine a network slice by which to transmit certain partitions of media content objects. In another embodiment, certain partitions of media content objects, or attributes related to certain partitions, may be assigned higher priorities. In this case, the higher priority partitions may be transmitted over network slices with higher QoS network performance characteristics (e.g., low latency and jitter). For example, the partition of objects in motion may be transmitted along a network slice with a higher QoS network performance characteristic (e.g., a low latency and jitter QoS network performance characteristics).

For example, supposing the storage system stores a partition of objects related to a position change of a current player, and this partition is assigned a higher priority in the network. The partitioning application may determine a network slice based on the mappings stored at the server, or determine a network slice having a higher QoS network performance characteristics since the partition to-be transmitted is a higher priority partition.

In an embodiment, a ledger application at the server may generate a ledger defining various parameters related to the successful transmission, reassembly, distribution, and rendering of the media packages, which may include one or more partitions of objects. In an embodiment, the ledger may be any data structure that may carry parameters and instruction sets used to implement different rendering methods, as further described herein. In an embodiment, the ledger may be encoded as a blockchain, with each block in the blockchain carrying at least one of the parameters and/or instruction sets. For example, the parameters may indicate how to fetch the media packages from the storage system, reassemble the media packages into the requested media content, decrypt the media packages, decompress the media packages, charge/pay for the requested media content, and any other data related to the media packages. Additional details regarding the ledger and the parameters in the ledger is described in the '937 Patent Application. The packaging application may also include one or more instruction sets used by the MEC server or one or more devices at a customer premise to perform certain tasks for the rendering and processing of the media content. In some cases, the packaging application may also include one or more instruction sets instructing one or more devices at a customer premise to distribute the rendering of the media packages according to the instruction sets, as further described in the '096 Patent Application.

In an embodiment, the ledger application may receive an indication (e.g., identifier) of the determined network slice for a particular partition of objects, and add the indication of the determined network slice as a parameter in the ledger corresponding to the partition of objects. The ledger application may also indicate, in a parameter, whether rendering of the media content objects is to be performed at the server such that rendered version of the partition of media content objects is transmitted to the end user device, or whether rendering is to be performed at the end user device side. When rendering is to be performed at the end user device side, the ledger application may also indicate, in a parameter, whether the rendering is to be performed at an MEC server as described in the '937 patent application, or across multiple devices including both the end user device and a rendering device as described in the '096 Patent Application. In an embodiment, a parameter or instruction set in the ledger may indicate methods for reintegrating the partition of media content objects into a final render of the media content being displayed on an end user device.

In an embodiment, a packaging application at the server may generate a package including one or more partitions of objects having the same or similar attributes, and a corresponding ledger for the partitions of objects. The package may include multiple media packages, each including partitions of objects having the same or similar attributes. The ledger may indicate the network slice over which to transmit the package and the one or more devices to which to send the package. The packaging application may transmit the package over the network slice indicated in the ledger to the one or more devices based on the parameters or instruction sets in the ledger.

The one or more devices receiving the package may include the MEC server, an end user device, a rendering device, and/or any other device at a customer premise. The one or more devices may perform rendering computations and reassembly operations according to the parameters and instruction sets included in the ledger, to display a final render of the media package including all of the media content objects from the partitions of objects received in the package at the end user device.

In some cases, the package includes media packages related to a cloud based interactive game, which may be ultimately rendered and displayed at the end user device. A user of the end user device may interact with the video game to play against or with opposing players over the Internet. A gaming application at the end user device may capture any updates to media content objects being rendered at the end user device as part of the video game. Similar to the partitioning application, the gaming application at the end user device may partition the updates to the media content objects based on the attributes of the media content objects that are being updated to obtain a partition of the object. In an embodiment, the gaming application may determine that the update to the media content objects should be transmitted upstream to the server across a particular network slice based on the mappings or a priority of the partition of the objects being updated. The end user device may then transmit, to the server, the update to the media content object with a ledger describing the update and the actual raw data related to the update. The server may update the storage system with the raw data and details from the ledger, and then forward the update to the opposing player devices that are also interacting with the video game. Since interactive video games are bi-directional, the end user device may receive updates from opposing players in a similar fashion, using partitions of objects and dedicated network slices provisioned across the network.

In some embodiments, the devices of the current player and the opposing players may already include the raw data used to render a particular frame, such that the updates may only include the data necessary to update the render of a particular media content object. For example, an avatar of the current player in the video game may change location and orientation, within a single already-rendered frame. In this case, the raw data included in the package may only include data related to the change in location and orientation of the avatar of the current player as (i.e., the package may not need to include all the additional data that was initially used to render the avatar of the current player, as this additional data may already be stored at the opposing player end user device).

By tailoring the updates to only include fine-grained information describing updated media content objects, the load on the network for cloud-based gaming can be drastically reduced by reducing the amount of data needing to be transmitted across the network for gaming interactions. In addition, since cloud based video games are bi-directional, these updates may be sent and received by end user devices of both the current player and the opposing players via the dedicated network slices, to ensure that the most significant rendering updates are provided to the devices in the most efficient manner. Therefore, the embodiments disclosed herein enable gaming media to be transmitted through the network to end user devices in a far more efficient manner, ensuring that certain media content objects are provided to the end user device in a more secure manner, over a network slice with guaranteed QoS network performance criterion, requirement, or characteristics (e.g., latency and jitter requirements).

Turning now to FIG. 1A, a network 100 is described. The network 100 comprises devices 102 and 104 located at a premise 106, a MEC server 107, a carrier network 108, a storage system 111, a server 113 in communication with the storage system 111, a cell site 114, and a network 117. The devices 102 and 104 located on the premise 106 include an end user device 102 and a rendering device 104. A premise may refer to a geographical area, a building, or at least a portion of the building, such as, for example, a private home, an office location, a hotel room, a bar, a medical office, a hospital, etc. The end user device 102 and the rendering device 104 may be communicatively coupled to the MEC server 107, carrier network 108, storage system 111, and server 113 via the cell site 114. The MEC server 107 may also be communicatively coupled to the end user device 102, rendering device 104, carrier network 108, storage system 111, and server 113 via the cell site 114.

The end user device 102 may be a cell phone, a mobile phone, a smart phone, a personal digital assistant (PDA), an Internet of things (IoT) device, a wearable device, an AR device, a headset device, a laptop computer, a tablet computer, a notebook computer, a medical device, a vehicle computer, etc. The end user device 102 includes a display 115, a gaming application 118, one or more application program interfaces (APIs) 121, and a central processing unit (CPU) 124. The display 115 may be a computer output surface or projecting mechanism that shows media content 123 to an end user operating the end user device 102. The media content 123 may be, for example, graphical images, audio, video, or any type of AR stream. In an embodiment, the media content 123 may be related to a video game. The gaming application 118 may be a software program or hardware device configured to play the media content 123 related to the video game via the display 115. The gaming application 118 may obtain a final rendered version of the media content 123 and play the rendered media content 123 on the display 115. The gaming application 118 may also generate, send, and receive update messages comprising updates to the rendered media content 123, as further described herein. The APIs 121 may be interfaces by which the end user device 102 may communicate with the rendering device 104, MEC server 107, carrier network 108, storage system 111, and server 113. The CPU 124 may be a central processor of the end user device 102, which may include one or more processors that executes instructions including a computer program to provide the functions of the end user device 102 described herein. The end user of the end user device 102 may be a subscriber of the carrier network 108, registered with the carrier network 108.

The end user device 102 may also include an instruction manager application 126A and/or one or more distributed applications 129B. The instruction manager application 126A may parse through and execute instruction sets 165 received in one or more ledgers 161. For example, a ledger 161 may include an instruction set 165 with logic indicating rendering operations and/or processing operations to be performed by the end user device 102 and/or the rendering device 104. The instruction manager application 126 may execute the instruction set 165 accordingly. The distributed application 129A may be loaded with logic or code, including conditional statements for enabling the distribution of rendering and/or processing of the media content 123 between multiple devices 102 and 104 located at the premise 106. For example, the distributed application 129A may be an executable smart contract written as code with a series of conditional statements. The distributed application 129A may be pre-installed on the end user device 102 or installed at the end user device 102 upon an event (e.g., being instantiated into the carrier network 108 or requesting media content 123 from the server 113).

In an embodiment, the end user device 102 may be a lightweight, handheld, or portable device that operates on battery power and includes limited processing and rendering capabilities. For example, the end user device 102 as referred to herein may be a mobile phone, a wearable device, or a tablet device, each having a display but with limited battery, processing, and rendering power.

The rendering device 104 may be a computing device, such as the computing device described below with reference to FIG. 7, with more powerful hardware and software resources relative to the end user device 102. In some cases, the rendering devices 104 may be connected to a constant power supply (e.g., an alternating current (AC) power mains), or have a much greater battery power than that of the end user device 102. However, the rendering device 104 may, in some cases, not include a display, a media player, or even speakers. In this way, the rendering device 104 may be a device on the premise 106 that may not be necessarily used by the user for playing the video game, but may instead be a server located on the premise 106 with powerful processing and rendering capabilities. Other end user devices 102 on the premise 106 may take advantage of the resources at the rendering device 104 to perform various processing and rendering tasks on behalf of the end user device 102.

The rendering device 104 may be one or more servers, a computer box, personal computer, laptop, or even a handheld device, such as a mobile phone or tablet, with processing, storage, and network transmission capabilities. The rendering device may include a graphics processing unit (GPU) 132, a CPU 133, and one or more APIs 134. The GPU 132 may be specialized processor used for graphics and video rendering in high fidelity, and may be efficient at manipulating computer graphics and image processing. The CPU 133 may be a central processor of the rendering device 104. The APIs 134 may be interfaces by which the rendering device 104 may communicate with the end user device 102, MEC server 107, carrier network 108, storage system 111, and server 113. The rendering device 104 and the end user device 102 may be registered with the carrier network 108 under the same customer account associated with the end user.

Similar to the end user device 102, the rendering device 104 may also include an instruction manager application 126B and one or more distributed applications 129B. The rendering device 104 may also include a rendering application 136, which operates with the GPU 132 to render the media content 123. Media content 123 is rendered when the raw or coded data and files related to the media content 123 is converted to a format required for display or printing. Rendering may be performed using different types of algorithms or modeling techniques, such as, for example, rasterization, ray casting, ray tracing, radiosity, etc.

The end user device 102 and the rendering device 104 may be communicatively coupled together via a wired or wireless link. When the link is wireless, the end user device 102 and the rendering device 104 may communicate with one another using various wireless communication protocols or connections, such as, for example, a Wi-Fi connection, a WLAN connection, a BLUETOOTH connection, a NFC connection, an ultra-wide band connection, etc.

It should be appreciated that the end user device 102 and the rendering device 104 may include other hardware and software components not otherwise shown in FIG. 1 or described herein. For example, in some embodiments, the end user device 102 may also include a rendering application 136 and/or a GPU 132.

The MEC server 107 (also referred to as a "far edge computing server") may be a computing device that extends the capabilities of cloud computing by bringing the services to the edge of the network 117. For example, the MEC server 107 may be one or more servers, a computer box, personal computer, laptop, or even a handheld device, such as a mobile phone or tablet, with processing, storage, and network transmission capabilities. The MEC server 107 may be positioned anywhere in the network 100 between the network 117 and the premise 106. For example, the MEC server 107 may be positioned at the edge of the network 100 between the premise 106 and network 117. As shown in FIG. 1A, the MEC server 107 may include a rendering application 136 and a GPU 132 to perform rendering operations on media content 123 on behalf of the end user device 102.

The cell site 114 provides the end user device 102, the rendering device 104, and/or the MEC server 107 a wireless communication link to the carrier network 108, network 117, storage system 111, and server 113 according to a 5G, a long term evolution (LTE), a code division multiple access (CDMA), or a global system for mobile communications (GSM) wireless telecommunication protocol. The network 117 may be one or more private networks, one or more public networks, or a combination thereof. While FIG. 1 shows the carrier network 108, storage system 111, and server 113 as being separate from the network 117, it should be appreciated that, in some embodiments, at least a portion of the carrier network 108, storage system 111, and server 113 may be part of the network 117.

The carrier network 108 may be a network including a radio access network (RAN) and a core network 141. The RAN may include the access network containing the radio elements of a cell network, and the core network 141 may include the elements that manage the subscriber information, call setup and routing, and related system supports. In an embodiment, the core network 141 may be an evolved packet core (EPC) core network. The core network 141 may be a configured to implement a 5G, a LTE, a CDMA, or a GSM wireless telecommunication protocol. In one embodiment, the core network 141 may be a 3rd Generation Partnership Project (3GPP) Evolved Packet System (EPS).

The core network 141 may store subscriber data related to one or more end users operating one or more end user devices 102 and rendering devices 104. The subscriber data may include, for example, device capabilities 146 related to one or more end user devices 102 and/or rendering devices 104 that have been registered with the carrier network 108. The device capabilities 146 indicate capabilities of the end user devices 102 and the rendering devices 104 belonging to the end user. For example, the device capabilities 146 may indicate the power reserve of the end user device 102 and rendering device 104, the processing resources at the end user device 102 and rendering device 104, the rendering resources at the end user device 102 and rendering device 104, whether the end user device 102 and/or rendering device 104 include a GPU 132, the display resolutions that the end user device 102 is capable of displaying, the type of media players installed at the end user device 102, the screen size of the end user device 102, the type of speaker at the end user device 102, etc. The carrier network 108 may also include one or more APIs 149 by which a network element in the carrier network 108 communicates with the end user device 102, rendering device 104, MEC server 107, storage system 111, and server 113.

While FIG. 1 shows the core network 141 as storing device capabilities 146, it should be appreciated that the core network 141 also includes other data and applications not otherwise shown in FIG. 1. For example, the device capabilities 146 may be stored in association with an AMF or SMF of the core network 141.

The storage system 111 may be a decentralized file system, such as, for example, an interplanetary file system (IPFS). For example, the storage system 111 may be located at one or more data centers and implemented as a cloud data storage. The storage system 111 may comprise multiple servers and memories (e.g., databases and data stores), often distributed over multiple locations, with each location being a data center. The storage system 111 may be owned and operated by a host, and may offer a pay-as-you-go model, in which users pay for storage and processing resources as they are used, which can help reduce capital expenses for operations.

The storage system 111 may store media content 123 in a distributed manner in the form of multiple media packages 150A-N across multiple database nodes 153A-N (also referred to herein as simply "databases 153A-N"), respectively. To this end, FIG. 1 shows the storage system 111 as including multiple database nodes 153A-N, which may each be a server node comprising memories for data storage. In some cases, each database node 153A-N may have a maximum storage capacity or may enforce a maximum file size or package size permitted for each file or package stored at the database node 153A-N. As shown in FIG. 1, each database node 153A-N stores a respective media package 150A-N.

Each media package 150A-N may include one or more partitions of objects 152A-N, which are media content objects included in the media package 150A-N that have been partitioned by the partitioning application 158, as further described herein. Each partition of objects 152A-N may correspond to a different category or type of media content object, and each partition of objects 152A-N may include multiple media content objects of the particular category or type. The database nodes 153A-N together storing the media packages 150A-N may be implemented as an IPFS cluster, or each of the database nodes 153A-N may be implemented as an IPFS cluster.

In some cases, the MEC server 107 may also store one or more of the media packages 150A-N, which may include the partitions of objects 152A-N. For example, the MEC server 107 may request one or more media packages 150A-N from the storage system 111 or the server 113 based on a request from an end user device 102 proximate to and/or served by the MEC server 107. Alternatively, the MEC server 107 may receive one or more media packages 150A-N from the storage system 111 based on expected consumption patterns of the end user device 102 proximate to and/or served by the MEC server 107.

The server 113 may be a server with processing, storage, and network transmission capabilities, which is coupled to the storage system 111 by the link 170, which may be a wired or wireless link. The server 113 may include a packaging application 156, a partitioning application 158, a ledger application 159 and one or more APIs 166. The packaging application 156 may receive media content 123, from a content producer or publisher, for publishing at the storage system 111. The packaging application 156 may then segment the media content 123 (i.e., the data and files that constitute the media content 123) into the multiple different media packages 150A-N, in which N may be any integer greater than 1.

The partitioning application 158 may partition (e.g., categorize, separate, or divide) media content objects in each of the media packages 150A-N based on attributes of the media content objects included in the media packages 150A-N to obtain one or more partitions of objects 152A-N for each of the media packages 150A-N. The attributes of the media content objects may indicate, for example, whether the media content object is a stationary object, a background object, an object related to a current player or user of the end user device 102, an object related to an opposing player or a user of a device that is not located on the premise 106, an object in motion in the background, etc. The attribute may indicate whether the media content object is a sprite, or a bitmap graphic that is designed to be a larger part of a frame or scene. The attribute may indicate whether the media content object is related to a rendering property of the media content object or a rendering effect to-be performed on the media content object, as described above.

The partitioning application 158 may further sub-partition each of the partitions of objects 152A-N into additional sub-partitions of objects 152A-N, which categorize the media content objects based on more fine-grained attributes. Each of the partitions of objects 152A-N can be handled differently in the network 100 based on distinctive QoS network performance requirements for the different partitions of objects 152A-N, as further described herein. The partitioning application 158 may transmit the partitions of objects 152A-N to the packaging application 156.

The packaging application 156 may then transmit the media packages 150A-N, including the corresponding partitions of objects 152A-N, to the storage system 111 for storage across the database nodes 153A-N in a distributed manner. The storage system 111 may store the different media packages 150A-N across the different database nodes 153A-N.

In an embodiment, the network 100 may be a 5$^{th}$ generation network implementing network slicing, such that multiple network slices are provisioned in the network. Each of the network slices may refer to a network or sub-network including various network elements (e.g., routers, bridges, switches, virtual private networks (VPNs), etc.) logically positioned on top of a shared network architecture (i.e., architecture of network 100). In some embodiments, the network slice refers to an isolated logical network provisioned in the network and tailored to fulfil diverse QoS network performance requirements for different partitions of objects 152A-N.

The partitioning application 158 may determine a network slice by which to transmit certain partitions of objects 152A-N to one or more devices 102, 104, and/or 107 based on QoS network performance characteristics of the network slices and attributes of the partition of objects 152A-N. In one embodiment, the server 113 may maintain pre-defined partition-to-slice mappings 164 indicating a correspondence between a partition of objects 152A-N and one or more network slices. The partitioning application 158 may perform a look-up in the partition-to-slice mappings 164 to determine a network slice by which to transmit certain partitions of objects 152A-N. In another embodiment, certain partitions of objects 152A-N having certain types of media content objects may be assigned higher priorities. In this case, the higher priority partitions of objects 152A-N may be transmitted over network slices with higher QoS network performance characteristics (e.g., low latency and jitter).

The ledger application 159 may be executed during the segmenting of the media content 123, before the segmenting, or after the segmenting, to generate a ledger 161 describing details regarding the media content 123 and the media packages 150A-N. The ledger 161 may be a manifest or any other type of ledger, for example, generated using a distributed ledger technology (DLT) protocol. The ledger 161 may be encoded as a blockchain or any other data structure. In some embodiments, the ledger 161 may comprise parameters 163 and/or the instruction sets 165, and may include various fields each representing different parameters 163 and/or the instruction sets 165.

The parameters 163 may be data related to the successful transmission and reassembly of the packages. In some embodiments, the parameters 163 may indicate how to fetch the media packages 150A-N and/or partitions of objects 152A-N from the storage system 111, reassemble the media packages 150A-N and/or partitions of objects 152A-N into the requested media content 123, decrypt the media packages 150A-N and/or partitions of objects 152A-N, decompress the media packages 150A-N and/or partitions of objects 152A-N using one or more tokenization methods, charge or pay for the requested media content 123, and any other data related to the packages. For example, one of the blocks or fields in the ledger 161 may indicate the compression or tokenization scheme used to compress the data in each of the media packages 150A-N, an order of the media packages 150A-N and/or partitions of objects 152A-N and a location of each of the media packages 150A-N and/or partitions of objects 152A-N (i.e., an address of the respective database node 153A-N) storing a respective media package 150A-N and/or partitions of objects 152A-N, or analytical data regarding, for example, a history of consumption of the media content 123 by one or more end user devices 102, etc.

As shown in FIG. 1A, the ledger 161 may carry a parameter 163 indicating a particular partition-to-slice mapping 164 for media package 150A-N including one or more partitions of objects 152A-N. For example, the ledger 161 may carry a parameter 163 identifying the network slice by which to transmit the partition(s) of objects 152A-N, which may be a unique pre-defined identifier of the network slice. In an embodiment, the ledger application 159 may generate multiple ledgers 161 for different devices 102, 104, and/107, each ledger 161 including a different parameters 163 and/or instruction sets 165.

In an embodiment, the parameters 163 may include one or more flags or bits indicating whether one or more instruction sets 165 are included in the ledger 161. The parameters 163 may also include an indication of the types or functions of the instruction sets 165 included in the ledger 161. An instruction set 165 includes logic or code instructing the different devices 102, 104, and/or 107 to perform the different rendering and processing tasks to generate the final render of the media content 123 using content 177 received from the server 113. The instruction sets 165 may be sets of logic or code which, when executed, causes a device 102, 104, and/or 107 to perform certain processing or rendering tasks for the media content 123. For example, an instruction set 165 may include conditional statements, or if/then clauses, that when executed enable the distribution of rendering and processing of the media content 123 between multiple devices 102 and 104 located at the premise 106. For example, the instruction set 165 may be an executable smart contract written as code with a series of conditional statements.

As should be appreciated, the server 113 may include other components, applications, and data other than the packaging application 156, the ledger application 159, and the APIs 166. While FIG. 1 shows the storage system 111 and the server 113 as being separate from each other but coupled together via a communication link 170, it should be appreciated that in other embodiments, the storage system 111 and the server 113 may be positioned together across the same servers in a data center, for example. In addition, although FIG. 1 shows the storage system 111 and the server 113 as being separate from the carrier network 108, it should be appreciated that in other embodiments, the storage system 111 and the server 113 may be part of the carrier network 108.

As an illustrative example, the packaging application 156 may also communicate with the core network 141 to determine the device capabilities 146 associated with the devices 102 and 104 belonging to a customer and located at the premise 106. For example, the packaging application 156 may request the device capabilities 146 associated with the devices 102 and 104 after determining that media content 123 is to be transmitted to the end user device 102. The packaging application 156 may determine that media content 123 is to be transmitted to the end user device 102 in various embodiments.

In a first embodiment, the packaging application 156 may determine, based on the device capabilities 146 of the end user device 102, that the media content 123 should be sent to the MEC server 107 for rendering, as further described in the '937 Patent Application. In this case, the packaging application 156 may generate a package 175 including the ledger 161 and content 177 associated with the media content 123. The content 177 may include the media package 150A-N, one or more partitions of objects 152A-N, and any corresponding raw data, media files, media libraries, gaming frameworks, and/or gaming APIs used to render the partitions of objects 152A-N. In an embodiment, the content 177 includes data associated with the media content 123 that has not yet been rendered. In another embodiment, the content 177 includes data associated with the media content 123 after rendering has been performed. The ledger 161 may describe the content 177, the one or more partitions of objects 152A-N, methods of reassembly and rendering to be performed by the MEC server 107, and/or a network slice by which to transmit the package 175. The server 113 may transmit the package 175 over the network slice to the MEC server 107. The MEC server 107 may perform the rendering on the content 177 according to the ledger 161 to generate a final render of the media content 123, and transmit the final render of the media content 123 to the end user device 102 for display.

In a second embodiment, the packaging application 156 may determine, based on the device capabilities 146 of the end user device 102 and the rendering device 104, that rendering of the media content 123 should be distributed between devices 102 and 104 at the customer premise 106, as further described in the '096 Patent Application. In this case, the packaging application 156 may again generate a package 175 including the ledger 161 and the content 177 associated with the media content 123. The ledger 161 may describe the content 177, the one or more partitions of objects 152A-N included in the content 177, methods of reassembly and rendering to be performed by the each of the devices 102 and 104, and/or a network slice by which to transmit the package 175. The server 113 may transmit the package over the network slice to the devices 102 and 104 at the customer premise 106. The rendering device 104 may perform the heavy rendering operations of the content 177 on behalf of the end user device 102 to obtain rendered content. The end user device 102 may still perform some processing on the content 177 as well, however, the rendering device 104 may perform the more complex rendering operations. The end user device 102 may receive rendered content from the rendering device 104 and generate a final render of the media content 123 for display at the end user device 102.

In a third embodiment, the packaging application 156 may determine, based on the device capabilities 146 of the end user device 102 and a current condition of the network, that the media content 123, particularly the partition of objects 152A-N, should be rendered at the server 113 and then transmitted down to the end user device 102. For example, the network 100 may be in a pristine state with little current congestion and therefore, high bandwidth availability, low latency, and low jitter. In this way, the large file sizes of rendered content may be efficiently and effectively transmitted through the network 100 to the end user device 102. In this case, the packaging application 156 may generate a package 175 including the ledger 161 and the rendered media content 123 of the one or more partitions of objects 152A-N. The ledger 161 may describe the rendered media content 123, the one or more partitions of objects 152A-N, and the network slice by which to transmit the package 175. The server 113 may transmit the package 175 over the network slice to the end user device 102. The end user device 102 may display the rendered media content 123, or the one more partition of objects 152A-N, on a display 115.

Figure 1B:
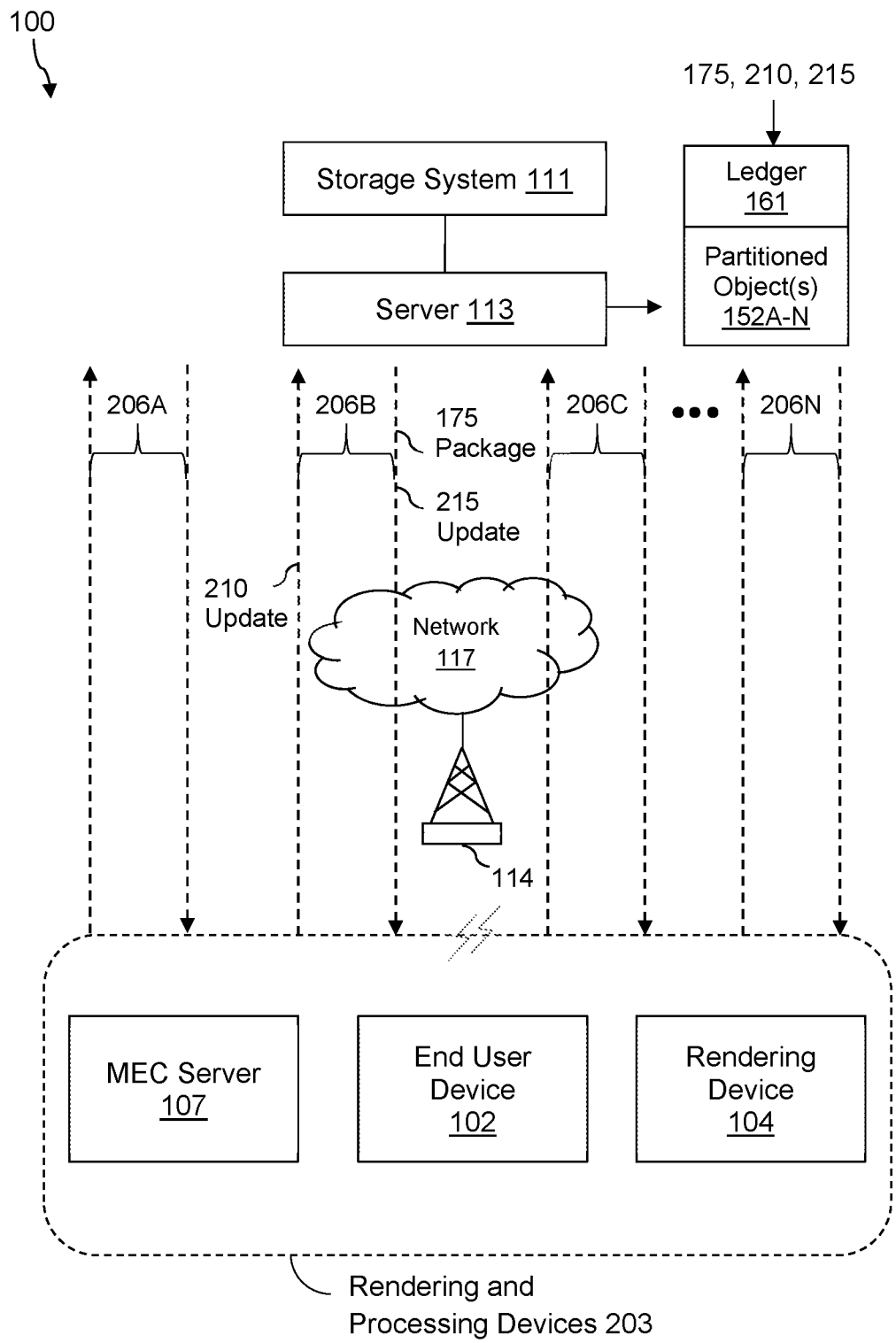

Turning now to FIG. 1B, the network 100 is described again. In particular, network 100 in FIG. 1B illustrates the network slices 206A-N provisioned in the network 100. As shown in FIG. 1B, the network slices 206A-N comprise logical portions of the network 100 from the server 113 to one or more rendering and processing devices 203, which may include the MEC server 107, end user device 102, and/or rendering device 104.

Each of the network slices 206A-N may include network elements configured to forward traffic pursuant to distinctive QoS network performance criteria. The QoS network performance criteria may include, for example, an expected latency, jitter, bandwidth, packet loss, data throughput rate, etc. For example, network slice 206A may include network elements configured to forward traffic at a low latency and low jitter, while network slice 206N may include network elements configured to forward traffic with a less strict latency and jitter requirement. In this way, network slice 206A has more a higher QoS network performance criteria than network slice 206N, and thus, data related to partitions of objects 152A-N having a higher priority may be sent over the network slice 206A instead of network slice 206N. For example, character motion related partitions of objects 152A-N may be sent over network slice 206A while background static related partitions of objects 152A-N may be sent over network slice 206N. While only four network slices 206A-N are shown in FIG. 1B, it should be appreciated that any number of network slices 206A-N may be provisioned in the network 100.

As shown in FIG. 1B, packages 175 may be transmitted downstream from the server 113 to the rendering and processing devices 203. The packages 175 may comprise a ledger 161 and the corresponding raw data related to the processing, rendering, and encoding of one or more partitions of objects 152A-N. The packages 175 may also include media files, media libraries, gaming frameworks, and/or gaming APIs used to render the partitions of objects 152A-N. In an embodiment, the partition of objects 152A-N in a single package 175 may only include data related to media content objects in a single partition of objects 152A-N (i.e., a single category or type of media content object). In another embodiment, a single package 175 may include partitions of objects 152A-N of multiple partitions of objects 152A-N (i.e., a multiple categories or types of media content object). However, these multiple partitions of objects 152A-N may have a similar priority and thus, the single package 175 including multiple partitions of objects 152A-N may be sent over the same network slice 206A-N. The ledger 161 may include parameters 163 and instruction sets 165, as described above. At least one parameter 163 may indicate the network slice 206A-N over which to forward the package 175.

Bi-directional update messages 210 and 215 may also be transmitted between the server 113 and the rendering and processing devices 203. An update message 210 and 215 is structured similar to the package 175, in that the update messages 210 and 215 include a ledger 161 and the raw data related to one or more partitions of objects 152A-N for which rendering needs to be updated. The ledger 161 may describe the updates to the partitions of objects 152A-N, include rendering/reassembly/reintegration instructions, and indicate a network slice 206A-N over which to transmit the update messages 210 and 215. The partitions of objects 152A-N in the update messages 210 and 215 include the media files and/or raw data related to the media content objects (including media libraries, gaming frameworks, and/or gaming APIs used to render the partitions of objects 152A-N).

For example, a current position and orientation of a character may be updated at the end user device 102, and in this case, the end user device 102 may generate an update message 210. The update message 210 may include a ledger 161 describing the updated position and orientation of the character and how to render/reintegrate the updated position and orientation of the character into a frame of the media content 123. In an embodiment, the update messages 210 and 215 include only the basic information necessary to convey the update to the partition of objects 152A-N. All extraneous information regarding background objects, other objects in a different partition 152A-N, or even data regarding the object that may be already known by other player devices are excluded from the update messages 210 and 215.

A rendering and processing device 203 may generate an update message 210 and transmits the update message 210 upstream to the server 113 via a particular network slice 206A-N, determined in a manner similar to that described above with reference to FIG. 1A. The server 113 may update the storage system 111 and forward the update message 210 to other devices that may be interacting with the media content (e.g., video game). Similarly, another device may generate the update message 215 and transmit the update message 215 upstream to the server 113, such that the server 113 updates the storage system 111 and forwards the update message 215 downstream via a particular network slice 206A-N to the rendering and processing device 203. The network slice 206A-N over which the update messages 210 and 215 are forwarded are based on at least one of the preset partition-to-slice mappings 164, current network conditions (or a current state of the network), and/or attributes of the partitions of objects 152A-N carried in the update messages 210 and 215.

Figure 2:
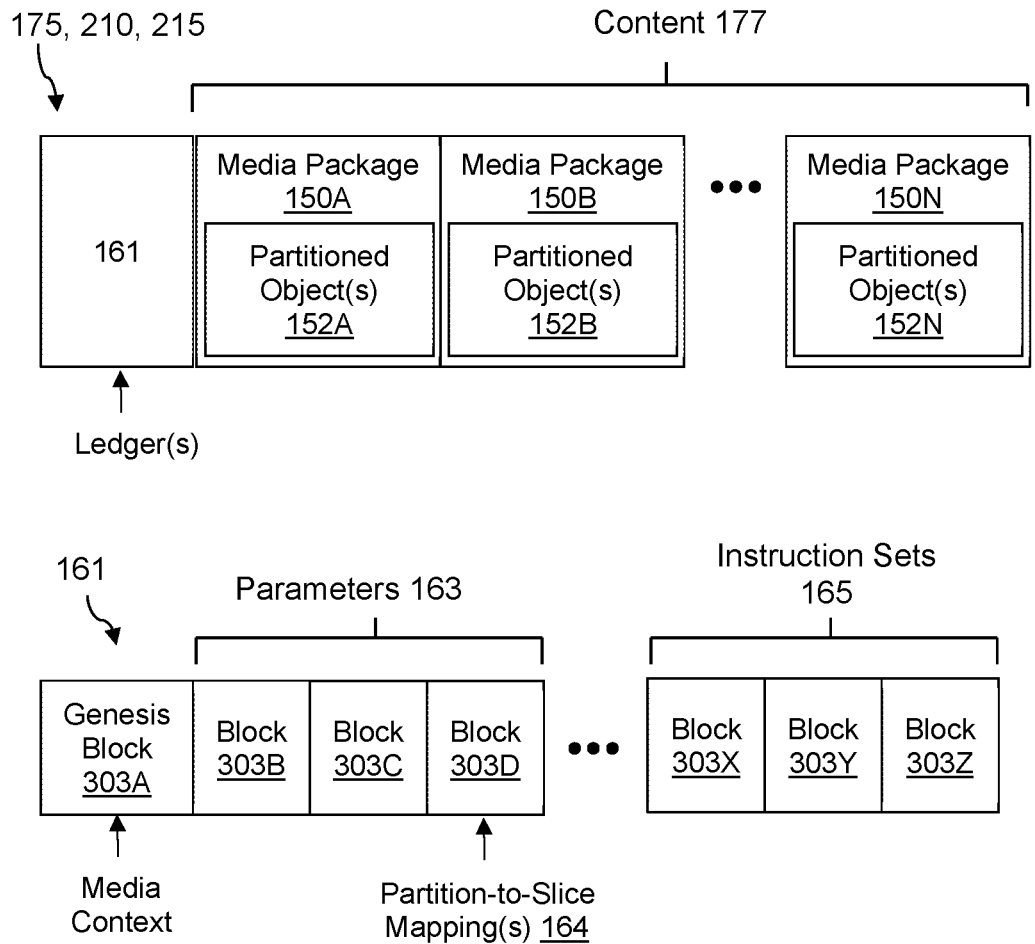
FIG. 2 is a block diagram illustrating a package transmitted in the communication system of FIG. 1 according to an embodiment of the disclosure.

Turning to FIG. 2, shown is a block diagram illustrating an example of a package 175 including a ledger 161 and the content 177. In an embodiment, the update messages 210 and 215 may also be encoded similar to the package 175 shown in FIG. 2.

The content 177 may comprise corresponding media packages 150A-N related to media content 123, which may have been requested by an end user device 102 during the streaming of the media content 123 or while interacting with a cloud based video game. Each of the media packages 150A-N may include one or more partitions of objects 152A-N. Each partition 152A-N may refer to one or more media content objects that have been grouped together by the partitioning application 158 based on attributes of the media content objects. In this way, each partition of objects 152A-N included in the media packages 150A-N that are sent in the package 175 may include similar attributes. The package 175 shown in FIG. 2 may include multiple media packages 150A-N, and each media package 150A-N may include partitions of objects 152A-N having similar attributes, such that the package 175 may be sent down a single determined network slice 206A-N.

The package 175 may be sent from the server 113 and/or storage system 111 to one or more of the rendering and processing devices 203, which may be the end user device 102, rendering device 104, and/or MEC server 107. The package 175 may be sent over the determined network slice 206A-N. While FIG. 2 shows the package 175 including the content 177 in a form that has not yet been rendered, in other embodiments, the package 175 may include content 177 associated with the media content 123 that is in rendered form after being rendered, for example, at the server 113.

In an embodiment, the package 175 includes one or more ledgers 161 associated with the media content 123 and the content 177 (i.e., media packages 150A-N and partition of objects 152A-N, including the raw data, files, libraries, and/or APIs for rendering the media content objects in the media content 123). In an embodiment, the ledgers 161 may be specifically generated for one or more of the rendering and processing devices 203. The one or more ledgers 161 may be carried in the package 175 as a preamble. In the embodiment shown in FIG. 2, the one or more ledgers 161 may be transmitted with the media packages 150A-N to the rendering and processing devices 203. However, another embodiment encompasses the scenario in which the ledgers 161 are first sent down to the rendering and processing devices 203 alone, and then the data in the ledgers 161 may be used by the rendering and processing devices 203 to subsequently fetch the media packages 150A-N from the storage system 111, server 113, or MEC server 107.

In the example shown in FIG. 2, the one or more ledgers 161 may be encoded as a blockchain. FIG. 2 illustrates examples of various blocks 303A-Z within an example ledger 161 encoded as a blockchain. For example, a first set of blocks in the blockchain or ledger 161 may carry parameters 163, a hash of the data in the block, a hash of the previous block in the blockchain, and/or any other data. The first block 303A in the example ledger 161 is referred to as a genesis block 303A, which may carry the media context of the media content 123. For example, the genesis block 303A may indicate the name of the media content 123 and locations of one or more of the media packages 150A-N and or partitions of objects 152A-N of the media content 123. The second block 303B may carry a parameter 163, such as, for example, a responsible party profile and authentication, authorization, and accounting (AAA) information. For example, the second block 303B may indicate whether the media packages 150A-N are capable of being delivered, whether the devices 102 and/or 104 are authorized to receive the media packages 150A-N, etc. The ledger application 159 may determine which rendering and processing device 203 to send the package 175 to by communicating with the core network 141 to receive the device capabilities 146 of the rendering and processing devices 203 and determine a current status of the network 100. The ledger application 159 may then add this information to block 303B in the ledger 161.

The third block 303C may carry another parameter 163, such as, for example, one or more flags indicating whether an instruction set 165 is included in the ledger 161 and/or an indication of the types or functions of the instruction sets 165 included in the ledger 161. The packaging application 156 may communicate with the core network 141 to determine whether rendering should be distributed among multiple devices 102 and 104 at the customer premise 106, and then generate the instruction sets 165 accordingly to optimize distribution of rendering tasks among the devices 102 and 104. The ledger application 159 may receive an indication that one or more distribution related instruction sets 165 should be included in the ledger 161 from the packaging application 156. The ledger application 159 may add this indication to the block 303C.

The fourth block 303D may carry another parameter 163 indicating a value identifying the network slice 206A-N over which to forward the package 175 in the network 100. For example, the fourth block 303D may carry the partition-to-slice mapping 164, which may be preset by an operator of the network 100. Alternatively, the fourth block 303D may carry an identifier of the network slice 206A-N over which to forward the package 175, which may be determined by the partitioning application 158.

The different blocks 303B-D may carry any type of parameter 163 other than those listed above. In an embodiment, a block 303B-D in the ledger 161 may indicate a definition for Low Latency Low Loss Scalable throughput (L4S), and whether L4S is applicable to the media content 123 being described in the ledger 161. If the ledger 161 indicates that L4S is applicable to the transmission of the media content 123 over the network slice 206A-N, the server 113 may transmit the package 175 across the determined network slice 206A-N in accordance with a relevant L4S standard. In this way, the embodiments disclosed herein support L4S servicing.

For example, the parameter 163 may include network profile information regarding the current network conditions in the communication network 100, locations of the media packages 150A-N in the storage system 111, data regarding compression and/or tokenization schemes used on the media packages 150A-N to compress the data in each of the media packages 150A-N, methods of reassembling and rendering the media packages 150A-N to generate a final render of the media content 123. The current network conditions may indicate, for example, backhaul signal strength, bandwidth (e.g., frequency bands), latency, throughput, jitter, packet loss, supported wireless technologies, types of devices communicating with the network element, antenna patterns, etc. The method of reassembling and rendering the media packages 150A-N may include instructions regarding how to rebuild the layers and/or pixels in each frame of the media content 123 based on the data and files in the media packages 150A-N and/or the correct sequence of the media packages 150A-N, such that end user device 102 may stitch together the media content 123 in the accurate sequence. Other example parameters 163 carried in the ledger 161 may include encryption data indicating encryption schemes performed on the media packages 150A-N, analytics functions and data, such as consumption data of the media content 123 by end user devices 102, settlement functions and data, and/or other implementation elements.

As shown in FIG. 2, a second set of blocks in the blockchain or ledger 161 may carry instruction sets 165, a hash of the data in the block, a hash of the previous block in the blockchain, and/or any other data. As mentioned above, the packaging application 156 may generate the instruction sets 165 based on device capabilities 146 and/or current conditions of the network 100. The ledger application 159 may receive the instruction sets 165 from the packaging application 156 and add the instruction sets 165 to each of blocks 303X, 303Y, and 303Z. For example, block 303X may carry an instruction set 165 with code for reassembling, decrypting, and/or decompressing the content 177 in the package 175. Block 303Y may carry an instruction set 165 with code for reintegrating different partitions of objects 152A-N into one or more frames the video game that may already be rendered and displayed at the rendering and processing device 203, or in an opposing player device. Since the ledger 161 may only carry the relevant raw data for rendering the media content objects themselves, and since media content frames display multiple different media content objects simultaneously, the instruction set 165 carried in block 303Y may be executed to seamlessly update the specific media content objects included in the partitions 152A-N. Block 303Z may include instruction sets 165 for performing any other task on the content 177 on behalf of the user.

FIG. 2 only shows the ledger 161 as including three parameters 163 and three instruction sets 165. However, it should be appreciated that ledger 161 may include any number of blocks carrying any type of parameter 163 related to the transmission and rendering of the media content 123 using the media packages 150A-N, and any type of instruction set 165.

Figure 3:
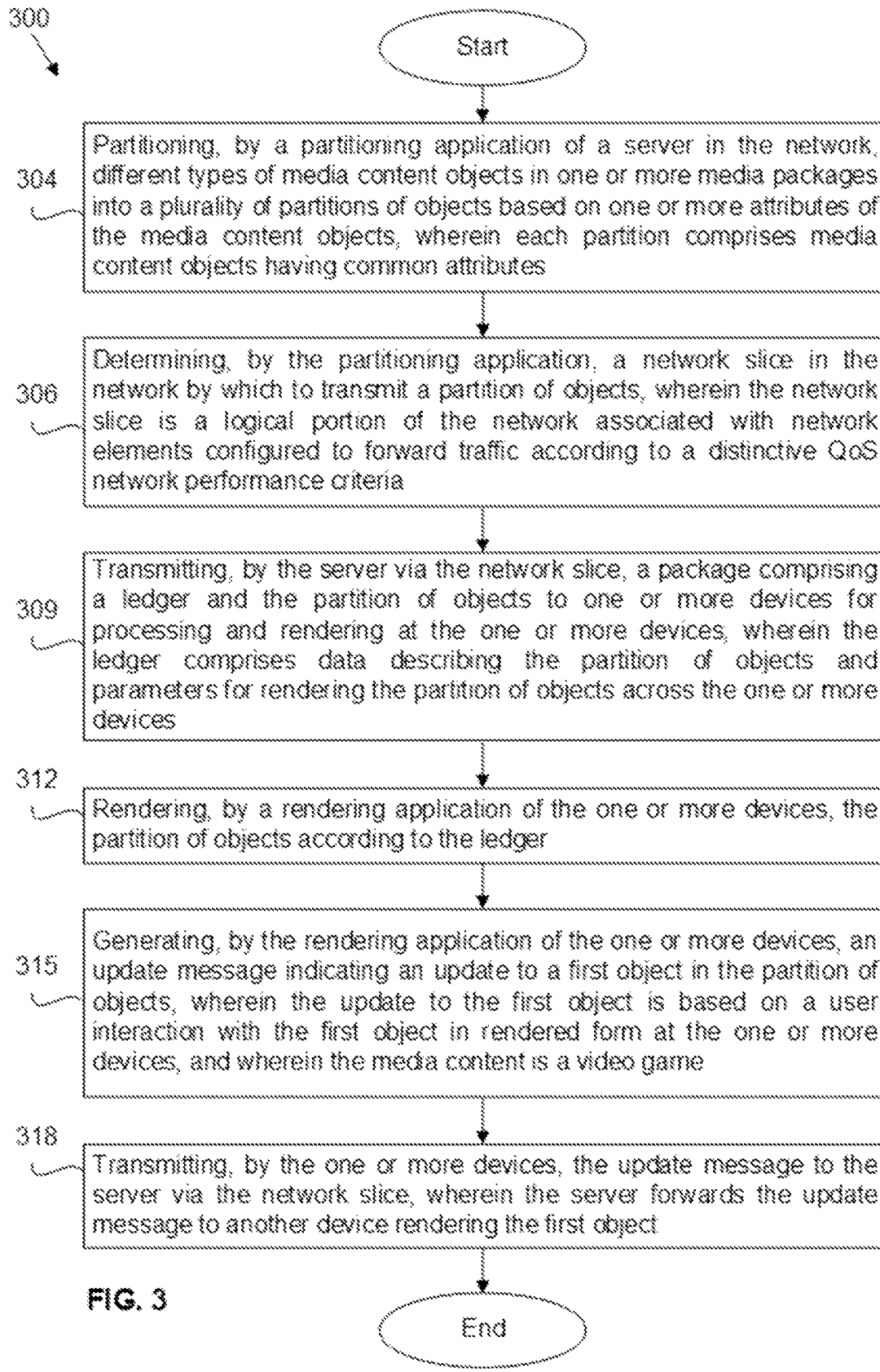
FIG. 3 is a flowchart of a first method according to an embodiment of the disclosure.

Turning now to FIG. 3, a method 300 is described. In an embodiment, the method may be performed by the server 113 and one or more of the rendering and processing devices 203 of network 100. The method 300 may be performed when media content 123 is to-be published to the storage system 111 in the form of media packages 150A-N including the partition of objects 152A-N.

At step 304, method 300 comprises partitioning, by a partitioning application 158 of the server 113, different types of media content objects in one or more media packages 150A-N into a plurality of partitions of objects 152A-N based on one or more attributes of the media content objects. In an embodiment, each partition 152A-N comprises media content objects having common attributes.

At step 306, method 300 comprises determining, by the partitioning application 158, a network slice 206A-N in the network 100 by which to transmit a partition of objects 152A-N. In an embodiment, the network slice 206A-N is a logical portion of the network 100 associated with network elements configured to forward traffic according to certain QoS network performance criteria, distinctive to the network slice 206A-N.

At step 309, method 300 comprises transmitting, by the server 113 via the network slice 206A-N, a package 175 comprising a ledger 161 and the partition of objects 152A-N to one or more devices 203 for processing and rendering at the one or more devices 203. In an embodiment, the ledger 161 comprises data describing the partition of objects 152A-N and parameters 163 for rendering the partition of objects 152A-N across the one or more devices 203.

At step 312, method 300 comprises rendering, by a rendering application 136 of the one or more devices 203, the partition of objects 152A-N according to the ledger 161. At step 315, method 300 comprises generating, by the rendering application 136 of the one or more devices 203, an update message 210 indicating an update to a first object 152A-N in the partition of objects 152A-N. In an embodiment, the update to the first object 152A-N is based on a user interaction with the first object 152A-N in rendered form at the one or more devices 203. In this embodiment, the media content 123 is a video game.

At step 318, method 300 comprises transmitting, by the one or more devices 203, the update message 210 to the server 113 via the network slice 206A-N. In an embodiment, the server 113 forwards the update message 210 to another device rendering the first object 152A-N.

Method 300 may include other steps or attributes not otherwise shown and described in FIG. 3. For example, in method 300, the different types of media content objects are partitioned into the plurality of partitions of objects 152A-N based on whether each of the media content objects corresponds to a stationary object, a current player, an opposing player, rendering properties, or a rendering effect. In an embodiment, the network slice 206A-N is determined based on at least one of preset partition-to-slice mappings 164, network conditions, or the attributes of the media content objects included in the partition of objects 152A-N. In an embodiment, the rendering is performed by at least one of partitioning the rendering across both an end user device 102 and a rendering device 104 located at a premise 106 of a user based on instruction sets 165 included in the ledger 161 or distributed applications 129A-B installed at the end user device 102 and the rendering device 104, or rendering, by the rendering application 136 at a MEC server 107, the partition of objects 152A-N according to parameters 163 and the instruction sets 165 included in the ledger 161. In an embodiment, the update to the first object 152A-N comprises a change in a location and an orientation of an avatar rendered in the video game being displayed at the end user device 102. In an embodiment, method 300 further comprises updating a storage system 111 coupled to the server 113 to indicate the update to the first object 152A-N after receiving, by the server 113, the update message 210. In an embodiment, method 300 further comprises packaging, by a packaging application 156 of the server 113, the media content 123 into a plurality of media packages 150A-N, wherein each of the media packages 150A-N is associated with a segment of the media content 123, and wherein each of the media packages 150A-N comprises the plurality of different types of media content objects.

Figure 4:
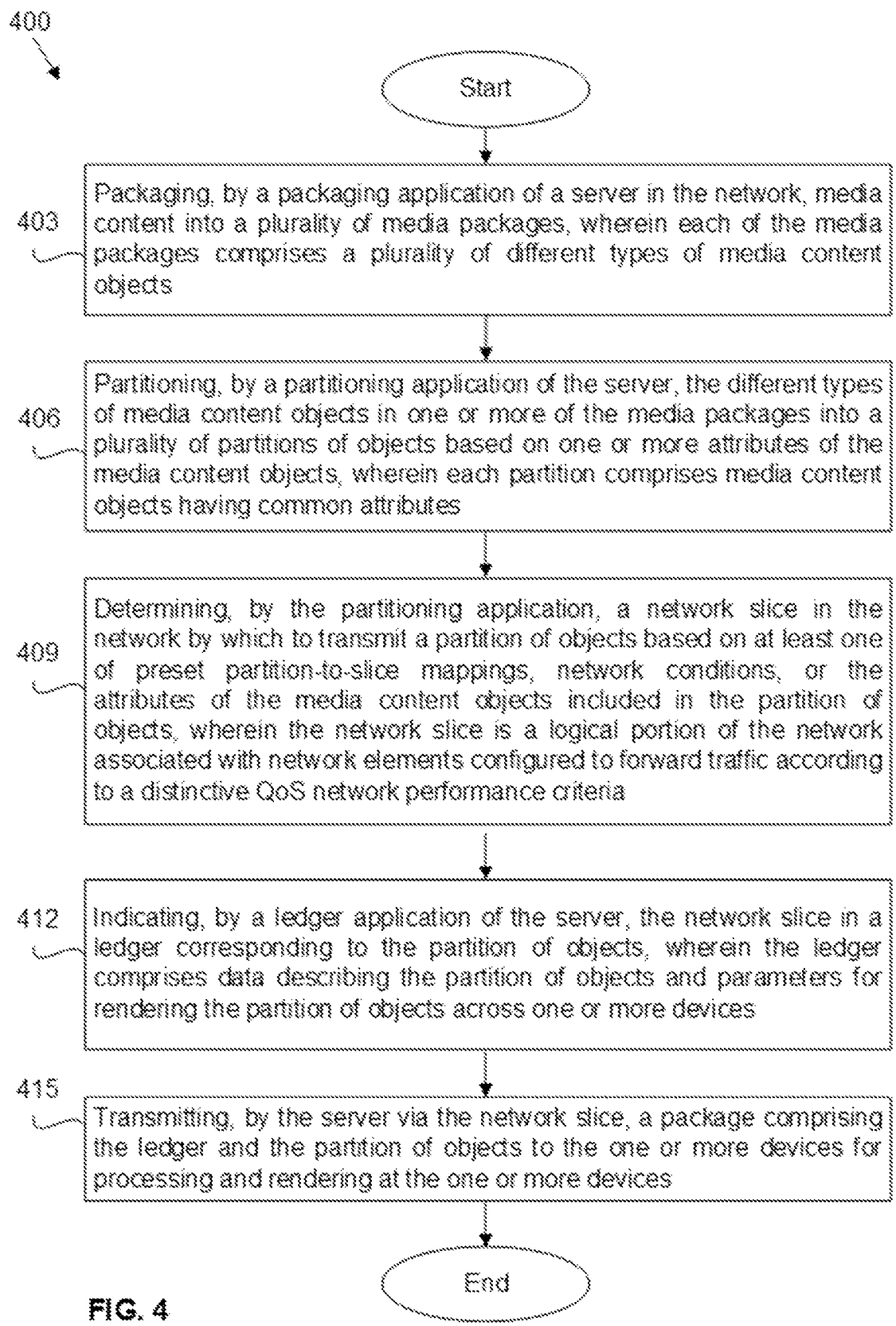
FIG. 4 is a flowchart of a second method according to an embodiment of the disclosure.

Turning now to FIG. 4, a method 400 is described. In an embodiment, the method may be performed by the server 113 of network 100. The method 400 may be performed when media content 123 is to-be published to the storage system 111 in the form of media packages 150A-N including partitions of objects 152A-N.

At step 403, method 400 comprises packaging, by a packaging application 156 of a server 113 in the network 100, media content 123 into a plurality of media packages 150A-N. Each of the media packages may comprise a plurality of different types of media content objects. At step 406, method 400 comprises partitioning, by a partitioning application 158 of the server 113, the different types of media content objects in one or more of the media packages 150A-N into a plurality of partitions of objects 152A-N based on one or more attributes of the media content objects. In an embodiment, each partition 152A-N comprises media content objects having common attributes.

At step 409, method 400 comprises determining, by the partitioning application 158, a network slice 206A-N in the network 100 by which to transmit a partition of objects 152A-N based on at least one of preset partition-to-slice mappings 164, network conditions, or the attributes of the media content objects included in the partition of objects 152A-N. In an embodiment, the network slice 206A-N is a logical portion of the network 100 associated with network elements configured to forward traffic according to a distinctive QoS network performance criteria.

At step 412, method 400 comprises indicating, by a ledger application 159 of the server 113, the network slice 206A-N in a ledger 161 corresponding to the partition of objects 152A-N. In an embodiment, the ledger comprises data describing the partition of objects 152A-N and parameters 163 for rendering the partition of objects 152A-N across one or more devices 203. At step 415, method 400 comprises transmitting, by the server 113 via the network slice 206A-N, a package 175 comprising the ledger 161 and the partition of objects 152A-N to the one or more devices 203 for processing and rendering at the one or more devices 203.

Method 400 may include other steps or attributes not otherwise shown and described in FIG. 4. For example, the different types of media content objects are partitioned into the plurality of partitions of objects 152A-N based on whether each of the media content objects corresponds to a stationary object, a current player, an opposing player, or a rendering effect. In an embodiment, the different types of media content objects are partitioned into the plurality of partitions of objects 152A-N based on whether each of the media content objects corresponds to a position of a media content object, an orientation of the media content object, a sprite of the media content object, a velocity of the media content object, or an axis aligned bounding box of the media content object. In an embodiment, the distinctive QoS network performance criteria of the network slice comprises a pre-determined latency and jitter requirement. In an embodiment, method 400 further comprises receiving, by the server 113 via the network slice 206A-N, an update message 215 indicating up date to a first object 152A-N in the partition of objects 152A-N. The devices 203 may be the MEC server 107 or the end user device 102 and the rendering device 104 located at the premise 106 of the user.

Figure 5:
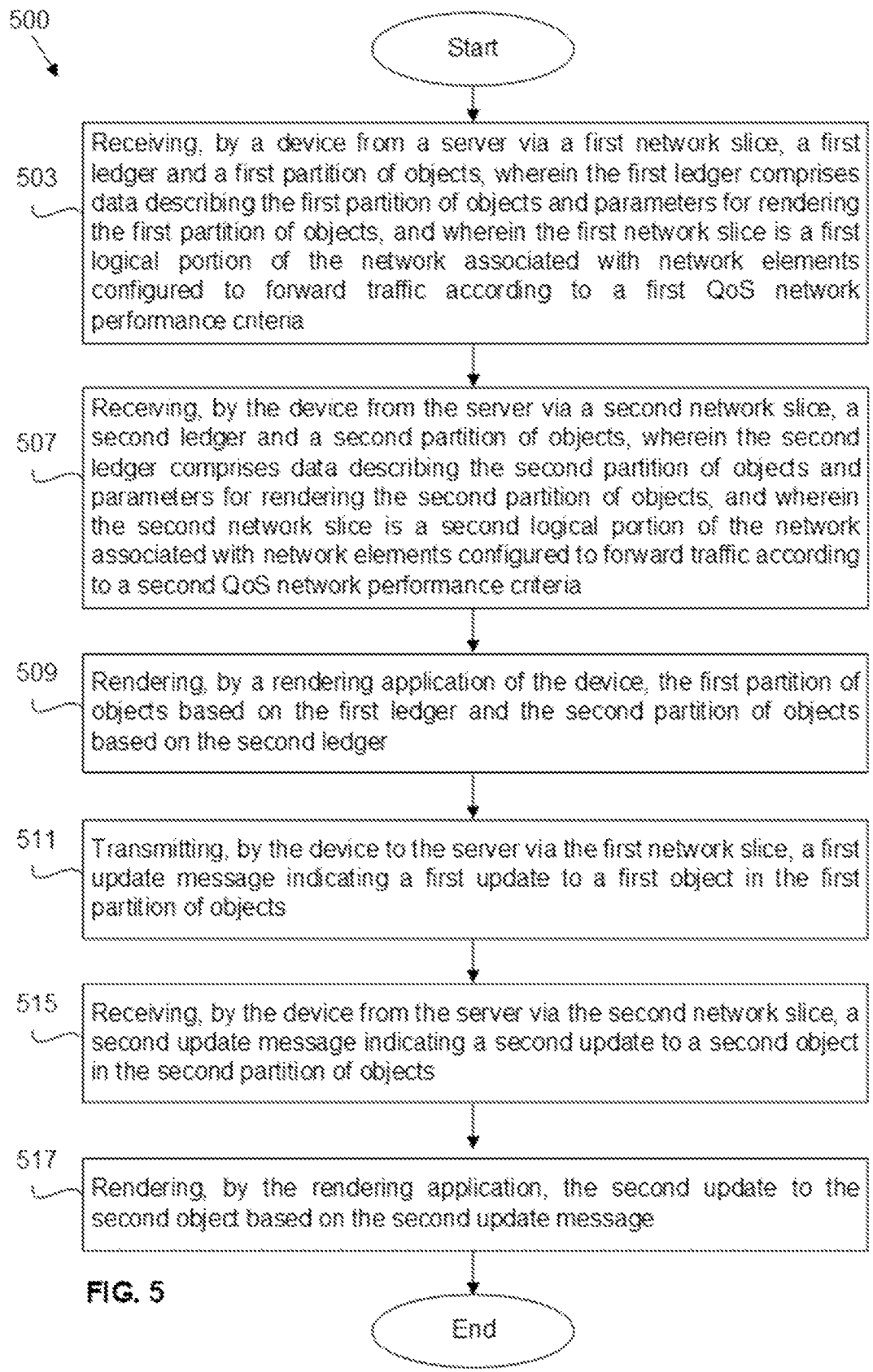
FIG. 5 is a flowchart of a third method according to an embodiment of the disclosure.

Referring next to FIG. 5, shown is method 500. Method 500 is performed by the one or more rendering and processing devices 203 of network 100. The method 500 may be performed after media content 123 has been published to the storage system 111 in the form of media packages 150A-N including partitions of objects 152A-N.

At step 503, method 500 comprises receiving, by a device 203 from a server 113 via a first network slice 206A-N, a first ledger 161 and a first partition of objects 152A-N. In an embodiment, the first ledger 161 comprises data describing the first partition of objects 152A-N and parameters 163 for rendering the first partition of objects 152A-N. In an embodiment, the first network slice 206A-N is a first logical portion of the network 100 associated with network elements configured to forward traffic according to first QoS network performance criteria.

At step 507, method 500 comprises receiving, by the device 203 from the server 113 via a second network slice 206A-N, a second ledger 161 and a second partition of objects 152A-N. In an embodiment, the second ledger 161 comprises data describing the second partition of objects 152A-N and parameters 163 for rendering the second partition of objects 152A-N. The second network slice 206A-N is a second logical portion of the network 100 associated with network elements configured to forward traffic according to second QoS network performance criteria.

At step 509, method 500 comprises rendering, by a rendering application 136 of the device 203, the first partition of objects 152A-N based on the first ledger 161 and the second partition of objects 152A-N based on the second ledger 161. At step 511, method 500 comprises transmitting, by the device 203 to the server 113 via the first network slice 206A-N, a first update message 210 indicating a first update to a first object 152A-N in the first partition of objects 152A-N. At step 515, method 500 comprises receiving, by the device 203 from the server 113 via the second network slice 206A-N, a second update message 215 indicating a second update to a second object 152A-N in the second partition of objects 152A-N. At step 517, method 500 comprises rendering, by the rendering object, the second update to the second object 152A-N based on the second update message 215.

Method 500 may include other steps or attributes not otherwise shown and described in FIG. 5. In an embodiment, the first network slice 206A-N and the second network slice 206A-N are determined based on at least one of preset partition-to-slice mappings 164, network conditions, or the attributes of the media content objects included in the first partition of objects 152A-N and the second partition of objects 152A-N. In an embodiment, the first update message 210 comprises an updated first ledger 161 comprising data describing the first update to the first object 152A-N and raw data used to render the first update to the first object 152A-N, and the second update message 215 comprises an updated second ledger 161 comprising data describing the second update to the second object 152A-N and raw data used to render the second update to the second object 152A-N. In an embodiment, the first update to the first object 152A-N comprises a change in a location of the first object 152A-N, an orientation of the first object 152A-N, a motion of the first object 152A-N, or a sprite of the first object 152A-N. In an embodiment, the second update message 215 to the second object 152A-N comprises an update to a rendering effect of the second object 152A-N, wherein the rendering effect comprises at least one of a shading, texture mapping, bump mapping, fogging, shadow, soft shadow, reflection, transparency, translucency, refraction, diffraction, indirect illumination, caustic, depth of field, motion blur, or non-photorealistic rendering of the second object 152A-N.

As an example, a primary manifest (e.g., at least a portion of the ledger 161) may have other links pointing to each media manifest (e.g., blocks in the ledger 161). The primary manifest may be the first file that is requested by a player at the end user device when media content 123, or video, playback begins. This file may list all of the available streaming versions of the video that are available, for example, at the storage system 111. This file generally includes 2 lines per version: the first line of the manifest entry may indicate some stream of information (i.e., bandwidth requirement, video resolution, codec descriptions so a player may find a compatible version for the browser), and the second line of the manifest entry may be a link to where the version of the video can be found at the storage system 111, for example. The video player at the end user device 102 may use the primary playlist to decide which quality of video should be played. The player may consider various factors, such as, for example, available network speed and a size of a playback window. If either of these parameters change, the player may adjust the stream to a different quality video, request the media manifest, and switch immediately to requesting the media files at a given time in the video playback.

Continuing with the example, media content 123 may be encoded as a Hypertext Transfer Protocol (HTTP) live streaming (HTP) video stream, with up to six different quality or bitrates. Upon request from an end user device, the server 113 may respond with 3 links: the primary manifest, a player Uniform Resource Locator (URL), and an iFrame embed. The video player and the iFrame embed links may use the primary manifest to begin playback.

Figure 6A:
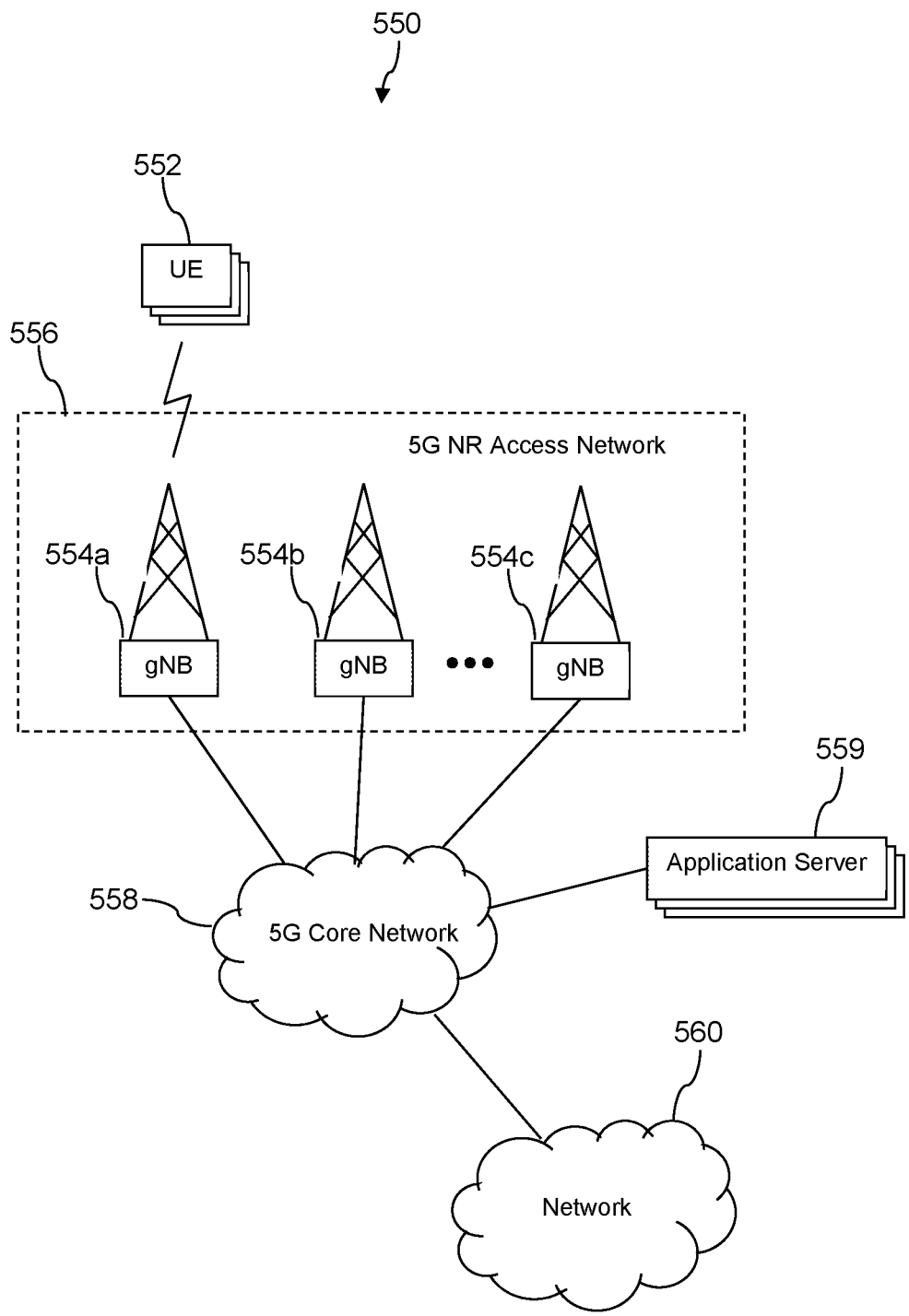
FIGS. 6A-B are block diagrams illustrating a communication system similar to the communication system of FIG. 1 according to an embodiment of the disclosure.

Turning now to FIG. 6A, an exemplary communication system 550 is described. In an embodiment, the communication system 550 may be implemented in the network 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as end user device 102 and the MEC server 107, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
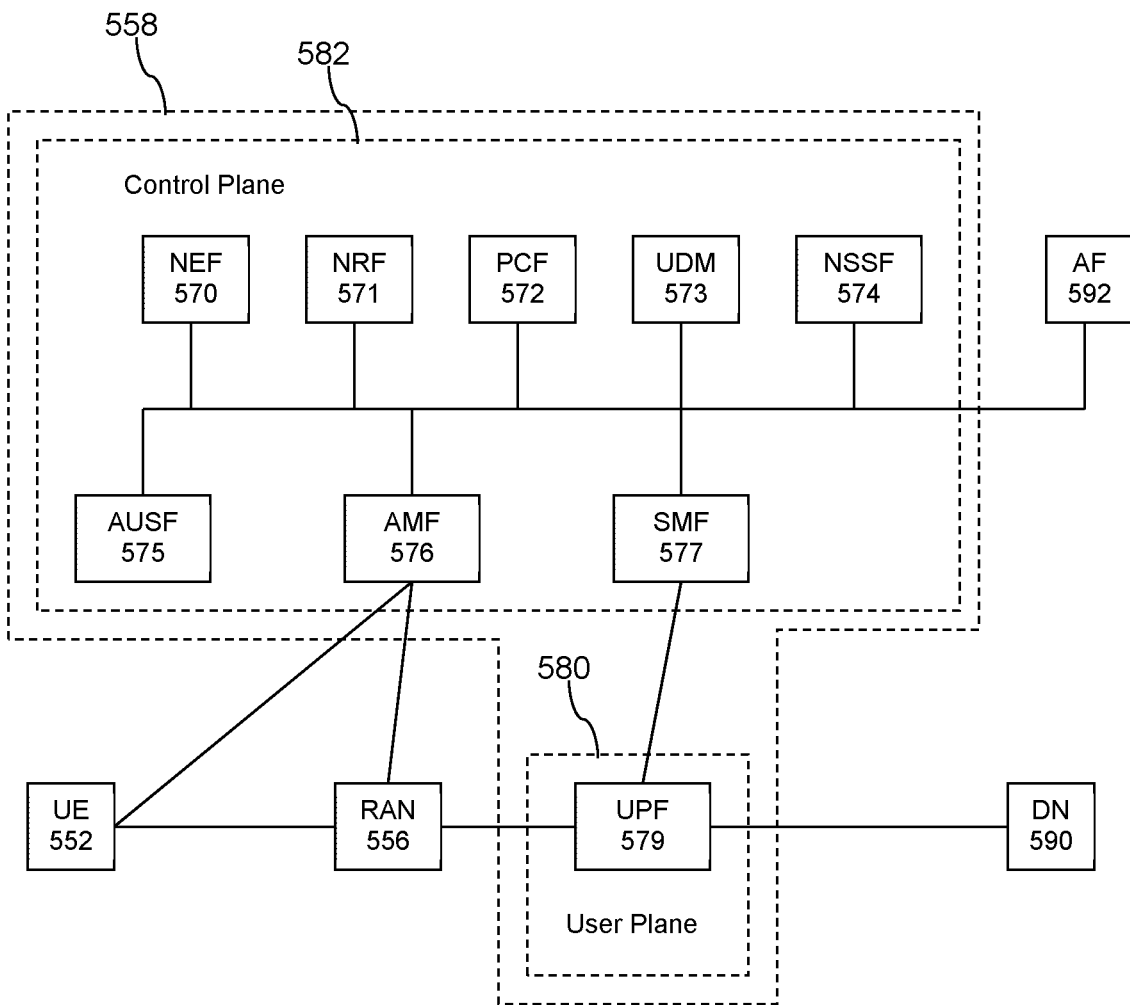

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
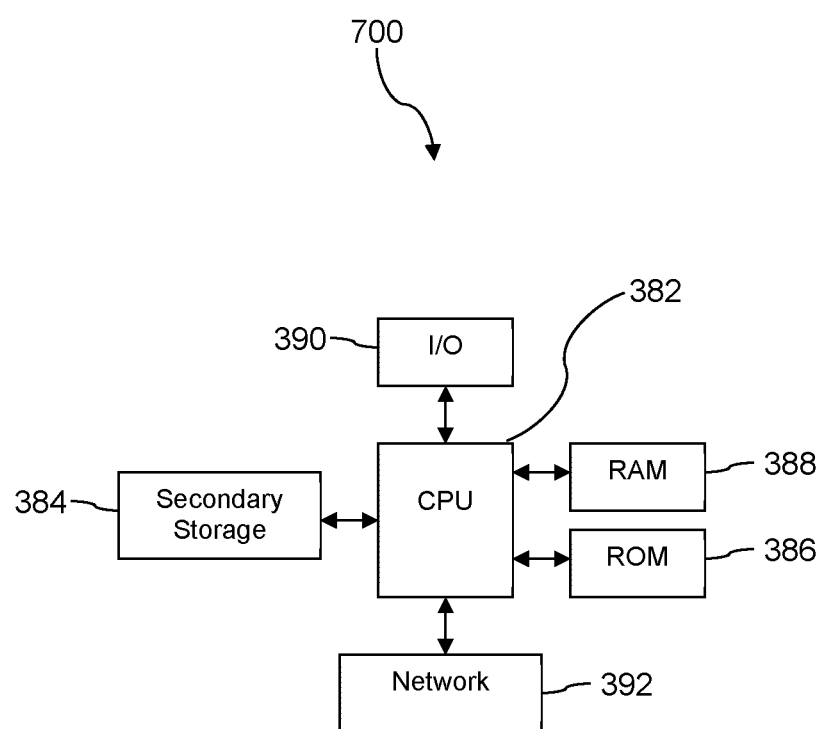
FIG. 7 is a block diagram of a computer system implemented within the communication system of FIG. 1 according to an embodiment of the disclosure.

FIG. 7 illustrates a computer system 700 suitable for implementing one or more embodiments disclosed herein. In an embodiment, the end user device 102, the MEC server 107, and the server 113 may be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for partitioning media content across different network slices in a network, implemented by a server and one or more devices, wherein the method comprises:
partitioning, by a partitioning application of a server in the network, different types of media content objects in one or more media packages into a plurality of partitions of objects based on one or more attributes of the media content objects, wherein each partition of the plurality of partitions comprises media content objects having common attributes;
determining, by the partitioning application, a network slice in the network by which to transmit a partition of objects, wherein the network slice is a logical portion of the network associated with network elements configured to forward traffic according to a distinctive quality of service network performance criteria;
transmitting, by the server via the network slice, a package comprising a ledger and the partition of objects to the one or more devices for processing and rendering at the one or more devices, wherein the ledger comprises data describing the partition of objects and parameters for rendering the partition of objects across the one or more devices;
rendering, by a rendering application of the one or more devices, the partition of objects according to the ledger;
generating, by the rendering application of the one or more devices, an update message indicating an update to a first object in the partition of objects, wherein the update to the first object is based on a user interaction with the first object in rendered form at the one or more devices, and wherein the media content is a video game; and
transmitting, by the one or more devices, the update message to the server via the network slice, wherein the server forwards the update message to another device rendering the first object.

2. The method of claim 1, wherein the different types of media content objects are partitioned into the plurality of partitions of objects based on whether each of the media content objects corresponds to a stationary object, a current player, an opposing player, rendering properties, or a rendering effect.

3. The method of claim 1, wherein the network slice is determined based on at least one of preset partition-to-slice mappings, network conditions, or the common attributes of the media content objects included in the partition of objects.

4. The method of claim 1, wherein rendering, by the rendering application of the one or more devices, the partition of objects according to the ledger comprises:
partitioning the rendering across both an end user device and a rendering device located at a premise of a user based on instruction sets included in the ledger or distributed applications installed at the end user device and the rendering device; or
rendering, by the rendering application at a mobile edge computing server, the partition of objects according to parameters and the instruction sets included in the ledger.

5. The method of claim 1, wherein the update to the first object comprises a change in a location and an orientation of an avatar rendered in the video game being displayed at an end user device.

6. The method of claim 5, further comprising updating a storage system coupled to the server to indicate the update to the first object after receiving, by the server, the update message.

7. The method of claim 1, further comprising packaging, by a packaging application of a server in the network, the media content into a plurality of media packages, wherein each of the media packages is associated with a segment of the media content, and wherein each of the media packages comprises the different types of media content objects.

8. A method for partitioning media content across different network slices in a network, wherein the method comprises:
packaging, by a packaging application of a server in the network, media content into a plurality of media packages, wherein each of the media packages comprises a plurality of different types of media content objects;
partitioning, by a partitioning application of the server, the different types of media content objects in one or more of the media packages into a plurality of partitions of objects based on one or more attributes of the media content objects, wherein each partition of the plurality of partitions comprises media content objects having common attributes;
determining, by the partitioning application, a network slice in the network by which to transmit a partition of objects based on at least one of preset partition-to-slice mappings, network conditions, or the common attributes of the media content objects included in the partition of objects, wherein the network slice is a logical portion of the network associated with network elements configured to forward traffic according to a distinctive quality of service network performance criteria;
indicating, by a ledger application of the server, the network slice in a ledger corresponding to the partition of objects, wherein the ledger comprises data describing the partition of objects and parameters for rendering the partition of objects across one or more devices; and
transmitting, by the server via the network slice, a package comprising the ledger and the partition of objects to the one or more devices for processing and rendering at the one or more devices.

9. The method of claim 8, wherein the different types of media content objects are partitioned into the plurality of partitions of objects based on whether each of the media content objects corresponds to a stationary object, a current player, an opposing player, or a rendering effect.

10. The method of claim 8, wherein the different types of media content objects are partitioned into the plurality of partitions of objects based on whether each of the media content objects corresponds to a position of a media content object, an orientation of the media content object, a sprite of the media content object, a velocity of the media content object, or an axis aligned bounding box of the media content object.

11. The method of claim 8, wherein the distinctive quality of service network performance criteria of the network slice comprises a pre-determined latency and jitter requirement.

12. The method of claim 11, further comprising receiving, by the server via the network slice, an update message indicating up date to a first object in the partition of objects.

13. The method of claim 8, wherein the one or more devices comprise a mobile edge computing server.

14. The method of claim 8, wherein the one or more devices comprise an end user device and a rendering device located at a premise of a user.

15. A method for partitioning media content across different network slices in a network, wherein the method comprises:

receiving, by a device from a server via a first network slice, a first ledger and a first partition of objects, wherein the first ledger comprises data describing the first partition of objects and parameters for rendering the first partition of objects, and wherein the first network slice is a first logical portion of the network associated with network elements configured to forward traffic according to a first quality of service network performance criteria;

receiving, by the device from the server via a second network slice, a second ledger and a second partition of objects, wherein the second ledger comprises data describing the second partition of objects and parameters for rendering the second partition of objects, and wherein the second network slice is a second logical portion of the network associated with network elements configured to forward traffic according to a second quality of service network performance criteria;

rendering, by a rendering application of the device, the first partition of objects based on the first ledger and the second partition of objects based on the second ledger;

transmitting, by the device to the server via the first network slice, a first update message indicating a first update to a first object in the first partition of objects;

receiving, by the device from the server via the second network slice, a second update message indicating a second update to a second object in the second partition of objects; and rendering, by the rendering application, the second update to the second object based on the second update message.

16. The method of claim 15, wherein the first network slice and the second network slice are determined based on at least one of preset partition-to-slice mappings, network conditions, or the attributes of media content objects included in the first partition of objects and the second partition of objects.

17. The method of claim 15, wherein the first update message comprises an updated first ledger comprising data describing the first update to the first object and raw data used to render the first update to the first object.

18. The method of claim 15, wherein the second update message comprises an updated second ledger comprising data describing the second update to the second object and raw data used to render the second update to the second object.

19. The method of claim 15, wherein the first update to the first object comprises a change in a location of the first object, an orientation of the first object, a motion of the first object, or a sprite of the first object.

20. The method of claim 15, wherein the second update to the second object comprises an update to a rendering effect of the second object, wherein the rendering effect comprises at least one of a shading, texture mapping, bump mapping, fogging, shadow, soft shadow, reflection, transparency, translucency, refraction, diffraction, indirect illumination, caustic, depth of field, motion blur, or non-photorealistic rendering of the second object.

* * * * *